May 10, 1927.  
B. H. URSCHEL  
BROACHING MACHINE  
Filed June 23, 1924

1,627,755

3 Sheets-Sheet 1

INVENTOR  
Bertis H. Urschel.  
by  
Owen, Owen & Crampton.

May 10, 1927.　　　　　B. H. URSCHEL　　　　　1,627,755
BROACHING MACHINE
Filed June 23, 1924　　　3 Sheets-Sheet 3

INVENTOR
Bertis H. Urschel.

Patented May 10, 1927.

1,627,755

UNITED STATES PATENT OFFICE.

BERTIS H. URSCHEL, OF BOWLING GREEN, OHIO.

BROACHING MACHINE.

Application filed June 23, 1924. Serial No. 721,610.

My invention has for its object to provide a broaching machine for broaching holes and channels of any shape in articles of any form, and to be used for any purpose. The machine is particularly designed for broaching articles formed of a hard metal such as iron or steel and the like, and provides for subjecting each of the articles to a plurality of broaching operations in order that the desired depth of cut may be made by the machine. The invention also provides broaches that may be withdrawn from the article without removal from the broach head or press or ram. Thus in embodiments of my invention, a plurality of articles may be subjected to successive broaching operations at one and the same time. The invention also provides a means for maintaining the broach in proper alignment with respect to the article in order that the desired accurate broaching operations may be performed upon the article. The invention also provides means for proper lubrication and for maintenance of the temperature to prevent overheating. The invention also has other features and advantages which will appear from the following description and upon examination of the drawings.

The invention may be contained in structures of different forms and to illustrate a practical application of the invention I have selected a broaching machine containing the invention as an example of such machines, and shall describe it hereinafter. The broaching machine selected is shown in the accompanying drawings.

Figure 1:
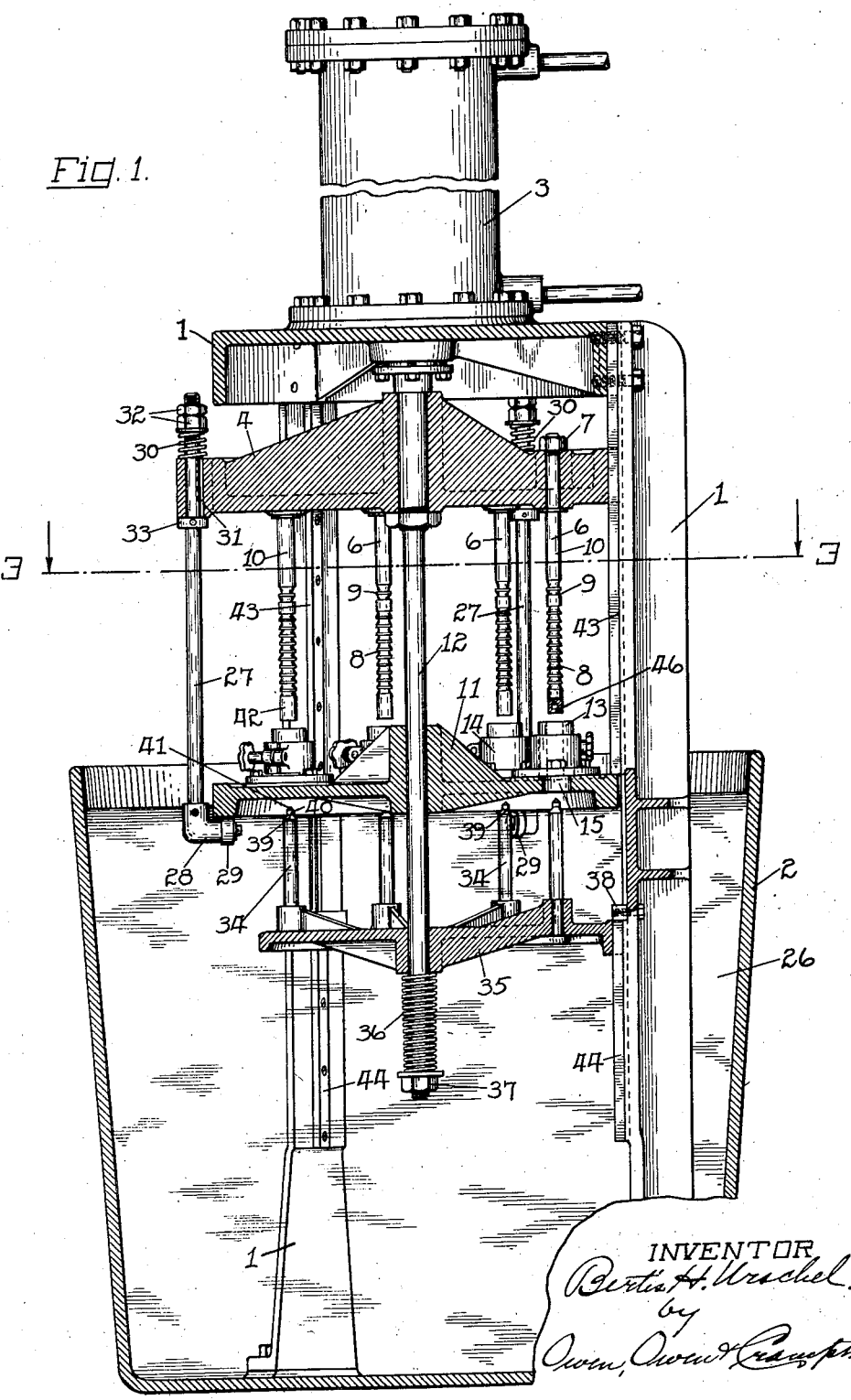
Figure 2:
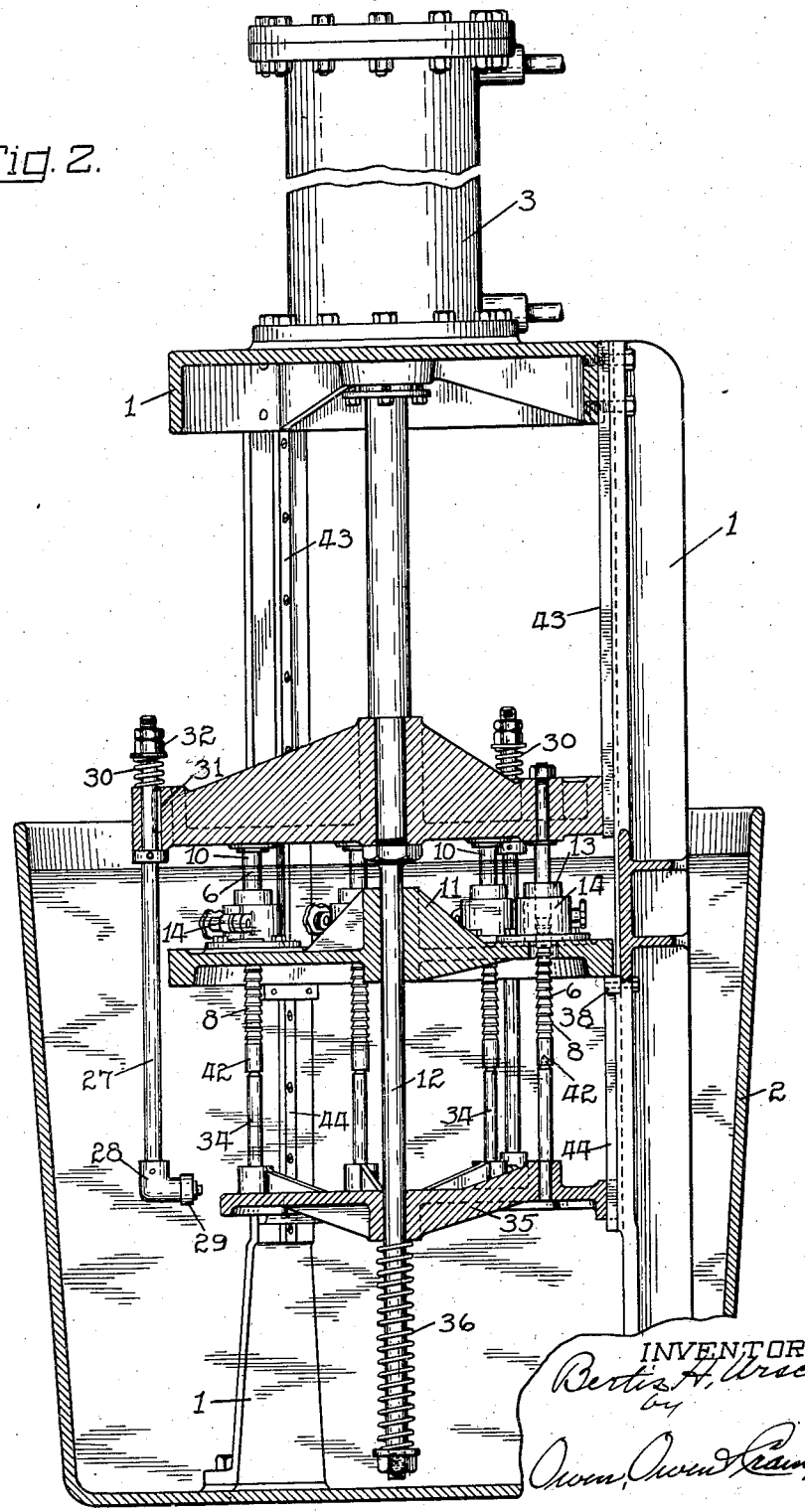
Figure 3:
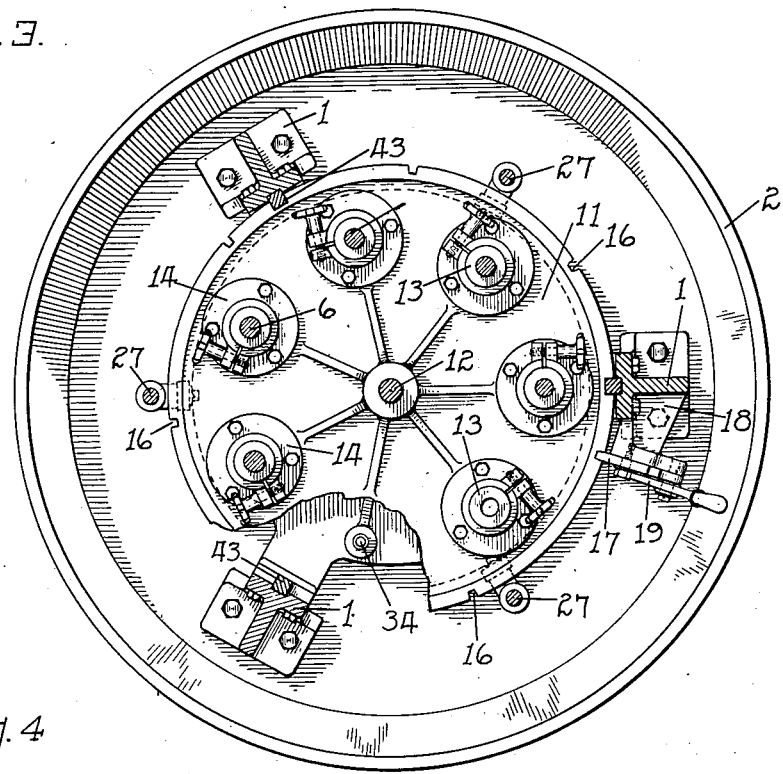
Figure 4:
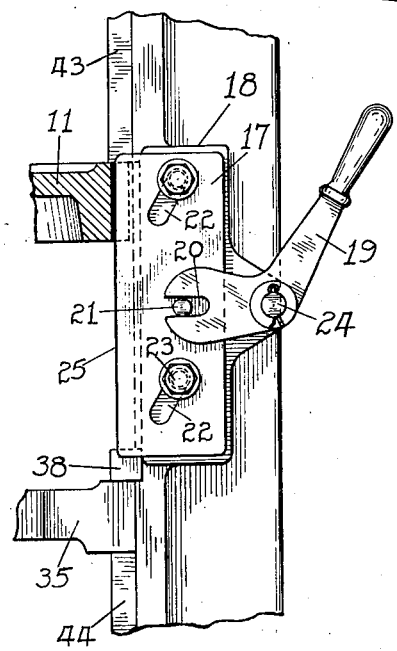
Figure 5:
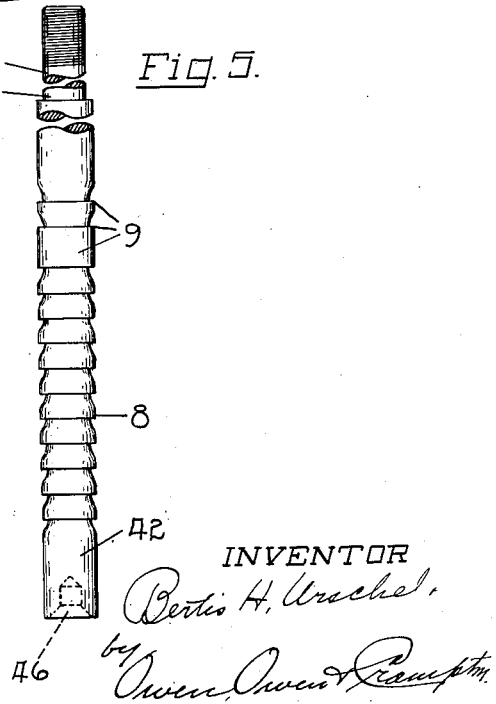

Figure 1 illustrates a sectional view of the machine when the broach head is in its raised position. Figure 2 is a sectional view of the broaching machine when the broach head is in a lowered position. Figure 3 is a sectional view taken on the line 3—3 indicated in Fig. 1. Figure 4 illustrates an indexing plate for securing the work table and consequently the articles to be broached in proper positions relative to the broaching tools. Figure 5 illustrates a side view of a broach that may be used in the broaching machine.

The broaching machine is provided with a suitable frame 1, preferably in the form of a tripod, which is located in a vat 2 for containing a proper lubricating and cooling liquid into which the articles broached are dipped during the broaching operation. The broach head is hydraulically operated by a suitable piston located in the cylinder 3. The pressure of the water or other liquid may be created by a high pressure multiple-stage centrifugal pump having manually or automatically operated valves for drawing the liquid from one side of the piston in the cylinder 3 and discharging it into the cylinder on the opposite side of the piston. Thus the power of the stroke may be controlled according to the opening of the manual or automatic valves up to the maximum capacity of the pump.

The broach head 4 is connected to the driving piston located in the cylinder 3 and is guided in its movements by the guide bars 43 that extend through slots formed in the edge of the broach head. The guide bars 43 are secured to the uprights of the tripod frame 1. The broaches 6 are secured in the broach head 4 by any suitable means such as the nuts 7 that are threaded on to the ends of the broaches 6 to draw the broaches 6 against a suitable shoulder formed on the broaches. Since the work done on the article is produced by a plurality of succeeding broaching operations, the broaches differ in size progressively and in the order in which the articles are subjected to the operations of the broaches. The shape of the cutting edges of the broach may differ according to the configuration of the cut that is to be formed in the article, and also according to the depth of cut that is to be made in order that the article may be shaped as desired by the broaching machine. In order that the broaches may be drawn from the articles by a return movement of the broach head, they are each provided with two sets of cutting edges. One set of cutting edges is graduated in size, increasing in diameter from the lower end of the broach towards the broach head, or they are so located as to cause an increasing depth of cut as the broach is forced over or through the article. The other set of cutting edges has a diameter substantially the same as the larger diameter of the first set, or they are located substantially the same distance from the axis or reference line of movement of the broach as the uppermost of the first set of cutting edges. They are formed so as to cut or burnish or finish on the return stroke of the broach. The broaches 6 moreover are provided with shanks of sufficient length in order that the cutting edges may be moved quite entirely through the article. Also they are provided with suitable pilots at their lower ends. Thus each broach is provided with the cutting edges 8 that progressively cut and enlarge the opening formed in the article during the downward stroke of the broach head, the cutting edges 9 that cut or finish to size upon the return stroke of the broach head in order to insure a comparatively easy return of the broach through the article, and a shank 10 having a length sufficient to cause the cutting edges of the broach to pass quite entirely through the article, and the sizes of the corresponding parts of the broaches increase successively in the order that the articles are subjected to the broaches.

The articles are secured to a work table 11 that is rotatably located on a shaft or spindle 12 that may be formed of an extension of the piston rod of the hydraulic motor. The articles 13 are secured in position by means of suitable jigs 14 of any suitable type well known in the art, and which are secured to the table 11. Suitable openings 15 are formed in the table 11 to permit the broaches to pass through or along the articles in the broaching operation. The table 11 is properly indexed so as to permit the table to be moved angularly between each successive broaching operation and then so positioned as to insure the proper placement of the articles relative to the broaches. The table 11 is thus provided with indexing notches 16 and a suitable indexing plate 17 having an edge extending parallel to the shaft or spindle 12 is supported on one of the uprights of the frame 1. The indexing plate 17 is slideably mounted on a bracket 18 that is secured to one of the uprights of the frame 1. A lever 19 is provided with a slot 20 in which a pin 21 is located and secured to the plate 17, while the plate 17 is provided with slots 22 disposed diagonally with respect to the edges of the plate, and bolts 23 are located in the slots 22 and secured to the bracket 18. Thus when the lever 19 is moved, the pin 21 slides in the slot 20 because of the change in direction of movement of the plate 17 relative to the end of the lever 19, which moves about the pivot pin 24. When the handle of the lever 19 is pushed down, the plate is moved diagonally upwards and away from the work table 16 and so as to move the edge 25 from its engagement with the work table. When the table has been rotated so as to bring the work in its next position, the lever 19 is raised and the table is moved so that the edge portion 25 of the plate 17 may engage with the succeeding notch 16 of the work table and thus place the articles in position such that they will be subjected to the operations of the succeeding broaches.

When the work table 11 has been indexed, the broach head 4 is lowered, which lowers the table 11 below the surface of a lubricating and cooling liquid 26 located in the vat 2, it being moved along the edge 25 of the indexing plate 17 to maintain it in the position in which it has been set with reference to the broaches. In order to lower the work 13 in the vat and submerge it in the liquid during the broaching operation, the work table 11 is supported on the ends of rods 27 that are connected to the broach head 4. The rods 27 may be provided with turned or angularly formed ends 28 that are provided with rollers 29 that engage the lower side of the table 11. The rollers 29 permit the angular rotative movements during the indexing of the table with respect to the broaches. The rods 27 extend through openings formed in the broach head 4 and are preferably provided with springs 30 that cushion their engagement with the table 11. To prevent rotation of the rods 27 and thus to maintain the rollers 29 in proper engaging relation with respect to the under side of the table, each rod 27 may be splined or slip-keyed in position as by means of the key 31. The spring 30 is located between the head 4 and suitable nuts 32, and the rod 27 is provided with a suitable shoulder or ring 33 located on the under side of the broach head 4, whereby movements of the rod relative to the broach head 4 are positively limited. Thus when the broach head 4 is lowered, the rods permit the work table 11 to be lowered until the articles 13 will be moved to a point below the level of the liquid 26.

As the work is lowered, the pilot centering pins 34 enter the articles located on the work table. The pilot centering pins 34 are supported on the pilot centering plate 35 which is also located on the spindle or shaft 12 and is guided by the rods 44 located on the uprights of the frame 1. The pilot centering plate 35 is spring-pressed upwards by means of the spring 36 located on the end of the spindle or shaft 12, and between the lower side of the pilot centering plate 35 and the nut 37 that is threaded on to the end of the shaft 12. The upward movement of the pilot centering plate 35 is limited by stops 38 that are bolted to the uprights of the frame 1. The stops 38 are so located as to position the upper ends of the pilot centering pins 34 below the work table 11 when the work table 11 is in its uppermost position and so that the pilot centering pins 34 will clear the work table 11 to permit the indexing operation of the work table. Also the stops 38 are so located that they will engage the work table when the articles 13 located on the work table are submerged within the liquid 26. Thus in the lowering operation, the pilot centering pins 34 pass through the work as the work and the broaches are lowered and engage with the ends of the broaches.

The pilot centering pins 34 are provided with cone-shaped shoulders 39 and a portion 40 having a reduced cross-sectional area that terminates in a cone point 41 that fit corresponding surfaces 46 formed in the pilot ends 42 located on the ends of the broaches 6. The ends of the pilot centering pins are thus provided with surfaces that positively engage and center the pilot ends of the broaches and since they are securely connected to the plate 35 that is guided by the spindle or shaft 12, and the uprights of the frame 1, the broaches will be held in perfect alignment with respect to the work. The sizes of the pilots 42 and of the pilot centering pins 34 may be substantially the same as that formed in the articles preparatory to their being inserted in the broaching machine or that may be formed by preceding operations of the broaches whereby the cutting edges of the broaches will be maintained in their proper relative cutting positions.

In the broaching operation, the broaches 6 are pushed through the articles 13, the pilot centering pins being held in engagement with the pins of the broaches by the spring 36. The spring 36 has sufficient resiliency to maintain the centering pins 34 in engagement with the ends of the broaches, notwithstanding the fact that the shaft or spindle 12 is moved down through the plate 35 and such that on withdrawal of the plate 35 it may be compressed so as to permit the return of the broach head 4 and table 11, although the plate 35 is engaged by the stops 38. On the return of the broach head 4, the table 11 is raised by reason of a frictional engagement between the articles 13 and the broaches until the table 11 strikes the ends of the rods 43, which limits the upward movement of the table 11. The cutting edges 9 then operate to cut or scrape the surface and slightly enlarge the openings which greatly reduces the friction between the articles 13 and the broaches 10. During the withdrawing operation of the broaches 9 from the articles 13, the table 11 is released and caught by the rods 27 that are cushioned by means of the springs 30. Also, during the raising of the head 4, the pilot centering plate 35 is raised by means of a rod 12 which presses on the spring 36, and until upward movement of the plate 35 is stopped by the stops 38. Thus the table 11 is again placed in position such that it may be rotated to again index the articles relative to the succeeding broaches that are to operate on the articles. Also the plate 11 is in position such that the article which has passed through the successive broaching operations to completion may be removed and another article may be inserted in position on the work table 11 for the successive broaching operations.

I claim:—

1. In a broaching machine, a broach head, a plurality of broaches secured to the broach head, a work supporting table rotatably supported below the broaches and means for rotating the table relative to the broaches, a centering plate, a plurality of centering pins secured to the plate for engaging the ends of the broaches and moving with the broaches while the broaches are operating on the object.

2. In a broaching machine, a broach head, a plurality of broaches secured to the broach head, a work supporting table rotatably supported below the broaches and means for rotating the table relative to the broaches, a centering plate, a plurality of centering pins secured to the plate for engaging the ends of the broaches and moving with the broaches while the broaches are operating on the object, and a guide for the centering plate.

3. In a broaching machine, a broach head, means for reciprocating the broach head, a plurality of broaches secured to the broach head, a rotatable and axially movable work table and means for rotating the table relative to the broaches, a movable centering plate, centering pins located on the said plate for engaging the ends of the broaches during the cutting operation, and means for guiding the broach head, the work table, and the centering plate.

4. In a broaching machine, a broach head, means for reciprocating the broach head, a plurality of broaches connected to the broach head, a work table supported on the broach head, a centering plate connected to the broach head, centering pins located on the centering plate for engaging the ends of the broaches during the cutting operation, and means limiting the movement of the work table to cause the broaches to operate on the work.

5. In a broaching machine, a broach head, means for reciprocating the broach head, a plurality of broaches connected to the broach head, a work table supported on the broach head, a centering plate connected to the broach head, centering pins located on the centering plate for engaging the ends of the broaches during the cutting operation, a container for containing a broach lubricating and a work temperature-maintaining liquid for receiving the work table.

6. In a broaching machine, a broach head, means for reciprocating the broach head, a plurality of broaches connected to the broach head, a work table supported on the broach head, a centering plate resiliently connected to the broach head, centering pins located on the centering plate for engaging the ends of the broaches during the cutting operation, and means for limiting the movement of the work table to cause the broaches to operate on the work.

7. In a broaching machine, a broach head means for reciprocating the broach head, a plurality of broaches connected to the broach head, a work table supported on the broach head, a centering plate resiliently connected to the broach head, centering pins located on the centering plate for engaging the ends of the broaches during the cutting operation, a container for containing a broach lubricating and a work temperature-maintaining liquid for receiving the work table.

8. In a broaching machine, a broach head means for reciprocating the broach head, a plurality of broaches connected to the broach head, a work table, a resilient means for connecting the work table to the broach head, a centering plate resiliently connected to the broach head and having centering pins for engaging the ends of the broaches during the cutting operation.

9. In a broaching machine, a broach head means for reciprocating the broach head, a broach connected to the broach head, a work supporting table, a centering plate, a centering pin connected to the centering plate for engaging the end of the broach and moving with the broach while the broach is operating on the object.

10. In a broaching machine, a broach head means for reciprocating the broach head, a broach connected to the broach head, a movable work supporting table, a movable centering plate, a centering pin connected to the centering plate for engaging the end of the broach during the cutting operation, and means for guiding the broach head, the work table, and the centering plate.

11. In a broaching machine, a broach head means for reciprocating the broach head, a broach connected to the broach head, a work supporting table connected to the broach head, a centering plate connected to the broach head and having a centering pin for engaging the end of the broach, and means for limiting the movement of the work table to cause the broaches to operate on the work.

12. In a broaching machine, a broach head means for reciprocating the broach head, a broach connected to the broach head, a work supporting table resiliently connected to the broach head, a centering plate resiliently connected to the broach head and having a centering pin for engaging the end of the broach during the cutting operation.

13. In a broaching machine, a broach head means for reciprocating the broach head, a broach connected to the broach head, a work supporting table resiliently connected to the broach head, a centering plate resiliently connected to the broach head and having a centering pin for engaging the end of the broach during the cutting operation, a lubricant and temperature maintaining liquid container for receiving the work table and the broach.

In testimony whereof, I have hereunto signed my name to this specification.

BERTIS H. URSCHEL.